June 1, 1965   R. C. LEVER ET AL   3,186,228
TIME-TEMPERATURE INTEGRATOR
Filed June 30, 1960

INVENTORS
RAY C. LEVER
THOMAS O. PAINE
BY
*Irving M. Freedman*
THEIR ATTORNEY

3,186,228
TIME-TEMPERATURE INTEGRATOR
Ray C. Lever, Loveland, Ohio, and Thomas O. Paine, Schenectady, N.Y., assignors to General Electric Company, a corporation of New York
Filed June 30, 1960, Ser. No. 40,082
2 Claims. (Cl. 73—362)

This invention relates to the measurement of integrated time and temperature and more particularly to an improved arrangement for providing an electrical signal proportional to integrated time and temperature.

The mechanical failure of components in high speed, high temperature power plants, such as jet engines, has been found to be related to the integrated product of both temperature and time with the life of such components essentially the complex integral of the product of temperature and time. For example, in a jet engine the engine blades are exposed to a high temperature and failure of the blades is often a result of gradual deterioration of the material of which they are constructed with such deterioration being related under conditions of steady stress to the integral of time and temperature. It therefore becomes desirable to provide an accurate and simple means for indicating the operating history of such components to indicate when replacement or overhaul is necessary. A record of temperature and time may be obtained by conventional equipment such as thermocouples and recorders, but such equipment is relatively expensive, cumbersome, and awkward for inclusion in aircraft. Also, integrating the product of the temperature and time data is relatively cumbersome and expensive.

A time-temperature integrator for use in moving vehicles such as aircraft should be preferably small, lightweight, and have no moving parts. Also, it is desirable that such an integrator be rugged, not readily affected by mechanical shocks and vibrations, and be relatively inexpensive. It is a primary object of this invention to provide an improved small and light-weight time-temperature integrator which has no moving parts.

It is a further object of this invention to provide an improved time-temperature integrator suitable for use in aircraft or other vehicles.

It is yet another object of this invention to provide an improved time-temperature integrator and integrating system which is relatively uncomplex and low in cost.

Further objects and advantages of this invention will become apparent as the following description proceeds, and the features of novelty which characterize this invention will be pointed out with particularity in the claims annexed to and forming a part of this specification.

In accordance with one form of this invention, a time and temperature integrator comprising a first electrically conducting material, a second material in intimate contact with the first material and means to expose the combination to the temperature which is to be integrated with respect to time. The change in electrical resistance due to solid state diffusion which is a function of time and temperature is indicated by means such as an electric instrument in circuit with a source of voltage.

Figure 1:
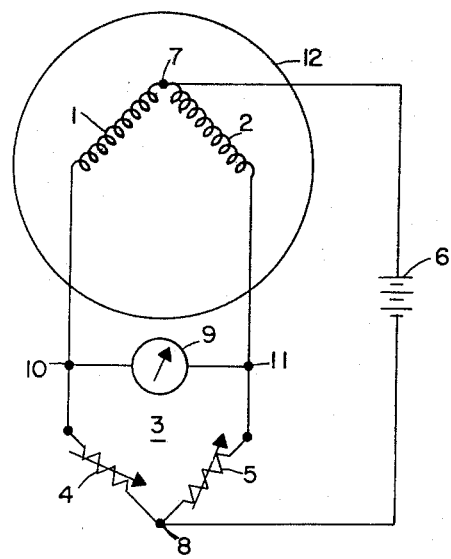
FIG. 1 is a schematic representation of an integrating system embodying the subject invention.

Referring to FIG. 1, a pair of primary detectors or transducers 1 and 2 are connected together to form the adjacent legs of a Wheatstone bridge 3. The remaining legs include reference impedances 4 and 5, respectively. A source of voltage such as battery 6 is connected across a pair of opposite bridge junctions 7 and 8 while an indicator such as millivoltmeter 9 is connected across the remaining junctions 10 and 11.

Figure 2:
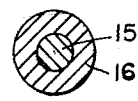
FIG. 2 is a cross-sectional view of a time-temperature integrating transducer fabricated in accordance with the invention.
Figure 3:
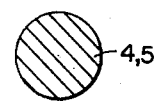
FIG. 3 is a cross-sectional view of the reference elements of the bridge of FIG. 1.

The time-temperature primary detector units 1 and 2 are each fabricated of two materials in intimate contact with each other. This may be readily accomplished, as shown in the cross-sectional view of FIG. 2, by having one material 15 completely surrounded concentrically by a second material 16. This can be readily produced by numerous deposition or plating techniques well known in the art or by swaging or wire drawing duplex rods wherein a core of one metal is surrounded by a sheath of a second metal. Metal strips may be plated with a second metal and subsequently slitted or punched into the desired configurations. The first material may be surrounded by the second in liquid or gaseous form.

Figure 4:
FIGS. 4 and 5 show alternate embodiments of the transducer shown in FIG. 2; and, FIG. 6 graphically illustrates certain principles of the invention.

An alternate way of obtaining the required contact between separate materials is to weave separate wires 17 and 18 as shown in FIG. 4. Intimate contact between the two wires can then be enhanced by swaging and/or drawing of the composite wire. The construction of the primary detector transducer elements 1 and 2 is not restricted to the use of two different materials, and may comprise three or more separate materials in order to obtain the desired resistance characteristics. For example, the woven configuration of FIG. 4 may include additional wires such as 19.

Figure 5:
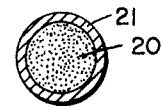

Many materials are not adequately ductile for rolling into strip or drawing into wires. A pressed-powder pellet of a homogeneous mixture of powders of two or more materials can be fabricated as shown in FIG. 5. Mixtures of powders 20 may be utilized to fill a tubular sleeve or sheath 21. The sheath is subsequently sealed and swaged to compact the powdered materials into intimate contact with each other. Care must be exercised in the production of such pellets to control the compacting pressure, and particle size, shape and distribution, all of which can be varied to provide the desired characteristics.

In the case of semiconductors, pressed pellets of high purity may be sintered with the diffusing material subsequently applied to the surfaces of the pellet. The pellet may be subsequently glazed or encapsulated to enable operation in reacting atmospheric environments.

While the complete principles of operation involved in the solid-state diffusion, which takes place in the primary detectors 1 and 2 when they are exposed to an elevated temperature, is not known, a diffusion process is accomplished which results in a change of resistance of the primary detectors 1 and 2, which process is governed in most cases by the following relationship:

$$D = D_0 e - \frac{\Delta E}{RT} e^{\frac{\Delta E}{RT}}$$

where:
$D$ = diffusion rate constant
$D_0$ = self-diffusion coefficient
$e$ = Naperian constant
$\Delta E$ = activation energy in cal./g. mole
$R$ = 1.98—the gas constant
$T$ = temperature in ° K.

$D_0$ and E are constants of the material or metals of the detectors 1 and 2. Relatively small constants indicate a fast changing device and large constants a long lived one. It is therefore necessary to select materials which would give the maximum amount of diffusion during the life of the proposed device.

The constant $\Delta E$ determines the dependency of $D$ on temperature. The effect of the "rate constant" $D_0$ can be modified by changing the degree of contact between the diffusing metals.

For example, tests which have been conducted on compacted metal powders fabricated in the manner described for FIG. 5 indicate that the composition of the metals determines the temperature range and the time of operation for substantial completion of the diffusion process.

A primary detector containing nickel and 10 percent titanium hydride powder ($TiH_2$) has been found to be suitable for operation at 400 degrees C. Under such conditions the resistance increased 533 percent in 36 days in a substantially linear manner. The same material at 500° C. increases in resistance in a substantially linear manner with the resistance increasing 410 percent in 11 days.

A mixture of nickel 10% Alnico 7 exhibits resistance changes through the diffusion process described above which increased the resistance 44% in 31 days at 400° C.; increased the resistance 95% in 6 days at 500° C.; and increased the resistance 480% in 23 days at 600° C.

The test results of various materials are set forth in Table 1 below:

Table 1

| Bar composition | Temp., °C. | Days | Change, R, percent |
|---|---|---|---|
| Ni/10% Mn | 400 | 36 | +118 |
|  | 500 | 11 | +160 |
| Ni/2% Si | 400 | 32 | + 66 |
|  | 500 | 6 | + 68 |
| Ni/10% Cr | 600 | 21 | − 70 |

It is to be noted from the above table that certain materials such as the diffusion of chromium and nickel will decrease the resistance of the composite metals of the primary detectors 1 and 2. The relationship between resistivity and the amount of reaction completed may be positive or negative, linear or nonlinear, dependent upon the materials utilized. Some semiconductors, such as silicon or germanium, provide relatively high magnitude of resistance and large substantially linear changes in resistivity with impurity concentration.

Figure 6:
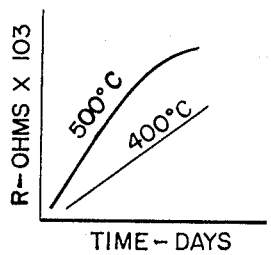

Variation of resistance with time of nickel-10% titanium hydride is illustrated graphically by FIG. 6.

Thus, the metals for detectors 1 and 2 may be selected to provide a desired resistance change rate by diffusion for selected temperature and operating periods.

By proper choice of materials and fabrication techniques it is possible to make the change of electrical conductivity proportional to the change in the physical strength of various jet engine blade materials or components under observation. The optimum combination may depend upon the nature of the atmosphere to which the primary detectors are exposed in that certain metals are not suitable for use under certain conditions such as an oxidizing atmosphere.

The reference impedances 4 and 5 are shown in FIG. 1 as variable impedances and may conveniently comprise fixed reference impedances in series with variable resistors. For certain applications the reference impedances 4 and 5 may be made identical to those of the primary detectors 1 and 2 after complete diffusion has taken place, that is, the reference impedances may include the same combination of metals as the primary detectors 1 and 2.

In operation, the primary detector or transducer elements 1 and 2 are positioned by a support member 12, illustrated schematically in FIG. 1 as 12, on or near the part or atmosphere under measurement to be exposed to the temperature under observation. An initial balance is made through variation of the reference impedances 4 and 5 so that the indicator 9 shows zero bridge unbalance. The subsequent exposure to elevated temperatures over a period of time causes a solid state diffusion of the second or impurity metal into the first metal of primary detector 1, primary detector 2 having already been completely diffused, thus resulting in unbalancing the bridge in a manner which is time and temperature dependent. The bridge unbalance and resultant indication provided by indicator 9 is related to the integral of both time and temperature.

Therefore, while particular embodiments of the subject invention have been shown and described herein, they are in the nature of description rather than limitation and it will occur to those skilled in the art that various changes, modifications, and combinations may be made within the province of the appended claims without departing either in spirit or scope from this invention in its broader aspects.

What we claim as new and desire to secure by Letters Patent of the United States is:

1. A device for measuring a change in a physical parameter of an element exposed to heat which is proportional to a complex integral of time and temperature comprising, a detector comprised of first and second electrically conductive materials in intimate contact, said materials being selected so that said sensor is subject to a change in resistivity due to diffusion of one of said materials into the other, said resistivity change being proportional to said complex integral of time and temperature, a heat source of varying output to which said element is exposed, means to expose said detector to heat from said source, and means to measure said change in resistivity of said detector, said measuring means being calibrated such that when a predetermined change in resistivity takes place, it will indicate that said physical parameter of said element has changed a predetermined amount.

2. The combination of claim 1 in which said measuring means comprises a second detector exposed to heat from said source and comprising said first and second materials, said second detector being substantially completely diffused prior to operation of said measuring means.

References Cited by the Examiner

UNITED STATES PATENTS

| 2,505,521 | 4/50 | Boyajian | 73—350 X |
| 2,546,415 | 3/51 | Alcock. | |
| 2,609,470 | 9/52 | Quinn | 338—22 |
| 2,749,753 | 6/56 | Adams | 73—362 |
| 2,993,169 | 7/61 | Poyle | 324—68 |
| 3,016,506 | 1/62 | Rakowski et al. | 338—22 |

FOREIGN PATENTS 1,080,682   4/60   Germany.

OTHER REFERENCES

"Diffusion in Metals," by A. Le Claire, pages 265–332 of "Progress in Metal Physics," published by Interscience Publishers Inc., 1953 Ed.

"Diffusion in Metals," by David Lazarus, pages 75–127 of "Solid State Physics," vol. 10, published by Academic Press N.Y., 1960 Ed.

General Electric Thermistor Manual, Aug. 15, 1956, Manual No. TH-13A.

ISAAC LISANN, *Primary Examiner.*